US007661563B2

(12) United States Patent
De Lataulade

(10) Patent No.: US 7,661,563 B2
(45) Date of Patent: Feb. 16, 2010

(54) DEVICE FOR PACKAGING AND DISPENSING A PRODUCT

(75) Inventor: Olivier De Lataulade, Levallois-Perret (FR)

(73) Assignee: L'Oreal, Paris (FR)

( * ) Notice: Subject to any disclaimer, the term of this patent is extended or adjusted under 35 U.S.C. 154(b) by 617 days.

(21) Appl. No.: 11/410,064

(22) Filed: Apr. 25, 2006

(65) Prior Publication Data

US 2006/0237489 A1 Oct. 26, 2006

Related U.S. Application Data

(60) Provisional application No. 60/675,890, filed on Apr. 29, 2005.

(30) Foreign Application Priority Data

Apr. 25, 2005 (FR) .................................. 05 51050

(51) Int. Cl.
*G01F 11/14* (2006.01)

(52) U.S. Cl. .................... 222/244; 222/382; 222/464.1; 366/130

(58) Field of Classification Search ............. 222/189.1, 222/196, 196.1, 196.5, 211, 226, 228, 229, 222/233, 234, 243, 244, 245, 246, 247, 382, 222/464.1, 464.2, 464.4; 239/33, 289, 374, 239/398; 366/130

See application file for complete search history.

(56) References Cited

U.S. PATENT DOCUMENTS

| | | | | |
|---|---|---|---|---|
| 946,085 | A * | 1/1910 | Wilson, Jr. | 222/196.5 |
| 4,019,661 | A * | 4/1977 | Szabo | 222/376 |
| 4,290,706 | A * | 9/1981 | Wandl | 401/4 |
| 5,611,467 | A * | 3/1997 | Peng | 222/464.4 |
| 6,006,958 | A * | 12/1999 | Bitton | 222/464.1 |
| 6,170,711 | B1 | 1/2001 | Sherman et al. | |
| 6,352,182 | B1 * | 3/2002 | Gueret | 222/321.9 |
| 6,371,334 | B1 * | 4/2002 | Lombardi | 222/325 |
| 7,441,941 | B2 * | 10/2008 | Vernon | 366/130 |
| 2002/0070244 | A1 * | 6/2002 | Simard | 222/382 |
| 2006/0250887 | A1 * | 11/2006 | Vernon | 366/130 |

FOREIGN PATENT DOCUMENTS

| | | |
|---|---|---|
| EP | 1 005 915 | 6/2000 |
| GB | 2 341 642 | 3/2000 |

* cited by examiner

*Primary Examiner*—Kevin P Shaver
*Assistant Examiner*—Daniel R Shearer
(74) *Attorney, Agent, or Firm*—Oblon, Spivak, McClelland, Maier & Neustadt, L.L.P.

(57) ABSTRACT

A device for packaging and dispensing a product such as a cosmetic product. A preferred example of the device includes a container forming a holder for the product, and a dispensing element surmounting the container. A dip tube is provided for supplying product to the dispensing element, with the dip tube being connected to the dispensing element by a first end. In addition, a body is able to slide along the dip tube. Further, the dip tube includes, at a distance from its first end, an element forming a stop piece for the body in such a way as to limit the movement of the body along the dip tube.

33 Claims, 1 Drawing Sheet

DEVICE FOR PACKAGING AND DISPENSING A PRODUCT

CROSS-REFERENCE TO RELATED APPLICATIONS

This document claims priority to French Application Number 05 51050, filed Apr. 25, 2005 and U.S. Provisional Application No. 60/675,890, filed Apr. 29, 2005, the entire contents of which are hereby incorporated by reference.

FIELD OF THE INVENTION

The present invention relates to a device that makes it possible to package and dispense a product designed to be shaken before being dispensed. The invention is particularly advantageous with a product that includes at least two mutually immiscible phases.

BACKGROUND OF THE INVENTION

Discussion of Background

Particularly in the cosmetic sector, some products are composed of at least two mutually immiscible phases having different densities. Examples are certain fragrances, hair care products, skin care products and the like. Before being dispensed, such products are preferably shaken in order to mix them as homogeneously as possible. In order to mix them, the user shakes the device in all directions, but it is not always easy by this means alone to achieve a homogeneous mixture.

EP1005915 discloses the use of a ball in a container for mixing the product contained in the container before dispensing it. The ball is free inside the container and therefore when the container is shaken it strikes the walls of the container.

U.S. Pat. No. 6,170,711 describes a product packaging and dispensing assembly that includes a product dispensing member having a dip tube. A magnetic component is provided in the dispensing member, as close as possible to the dispensing orifice, to expose the product to a magnetic field before it is dispensed. The magnetic component may be in the form of for example a cylinder or sphere surrounding the tube, around which it can slide freely. The magnetic component floats on the upper surface of the liquid so as to remain as close as possible to the dispensing member.

SUMMARY OF THE INVENTION

There is a need to provide a device for packaging and dispensing a product, particularly a product comprising two mutually immiscible phases, which will enable the product to be mixed with ease before it is dispensed.

There is also a need to provide such a device that is easy to assembly. There is also a need to provide such a device having improved aesthetic qualities.

According to the invention, these objects can be achieved by a device for packaging and dispensing a product such as a cosmetic product. According to a preferred example, such a device includes a container forming a holder for the product, with a dispensing element surmounting the container. A dip tube is provided for supplying product to the dispensing element, with the dip tube being connected to the dispensing element by a first end. In addition, a body is able to slide along the dip tube. Further, the dip tube includes, at a distance from its first end, an element forming a stop piece for the body in such a way as to limit the movement of the body along the dip tube.

The body that moves along the dip tube enables the product to be mixed when the device is shaken before the product is dispensed. Since the body is held on the dip tube, there is no risk of the moving body damaging the container when it is being shaken even if the material used for the moving body is relatively hard and the material for the container is more fragile.

According to an example of an embodiment, the element forming the stop piece limits the travel of the moving body along the dip tube when the device is shaken. Moreover, during assembly of the device, the element forming the stop piece can enable the moving body, which has been fitted onto the dip tube, to be kept in place before the dip tube is attached to the dispensing element. The dispensing element fitted with the dip tube and moving body can easily be handled with little or no risk of the moving body being lost, in particular before it is delivered on a container filling line.

By way of example, the element forming the stop piece can be situated at a second end of the dip tube, remote from the first end. This arrangement will maximize the length of travel of the moving body and can optimize the stirring of the product.

The moving body may be, for example, cylindrical, spherical or olive-shaped. It may of course have any other shape.

The moving body can be made in one piece or, alternatively, be made up of several pieces assembled together around the dip tube.

Also by way of example, the moving body can be made of a material selected from plastics, pressed glass, stainless steel and zamak. The material can also be plastic-coated.

The dispensing element can be, for example, a pump, and the pump may be mounted on the container, for example by snap-fastening, screwing or crimping.

The dispensing element may be surmounted by a push-button, which optionally can include a release arrangement, for example, in the form of a nozzle. Alternatively, the push-button may have a simple product outlet orifice. It may for example be in the form of a spout, at the end of which an outlet orifice is formed.

According to an example, the container may be made of a transparent material so that the product contained in the container can be seen from the outside. The container may for example by made of glass. By selecting the color of the product, and in particular of the different phases, if any, and the color of the moving body, a dispensing device having an attractive aesthetic appearance can be obtained from a transparent container.

Also by way of example, the container may contain a product composed of at least two mutually immiscible phases having different densities, with at least one of the phases being liquid. For example, the product may include a liquid phase and a particulate phase whose density is different from that of the liquid phase. The particulate phase may be in the form of a powder, microcapsules or nanocapsules, pigments, fillers or nacres. Alternatively, by way of example, the product may comprise an aqueous liquid phase and an oily liquid phase.

The device is particularly useful for packaging and dispensing a cosmetic product such as a fragrance.

As should be apparent, the invention can provide a number of advantageous features and benefits. It is to be understood that, in practicing the invention, an embodiment can be constructed to include one or more features or benefits of embodiments disclosed herein but not others. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

In addition to the features discussed above, a number of other features or advantages will become apparent from the description herein of non-restrictive illustrative embodiments described with reference to the accompanying figures, in which.

DETAILED DESCRIPTION OF THE PREFERRED EMBODIMENTS

Figure 1:
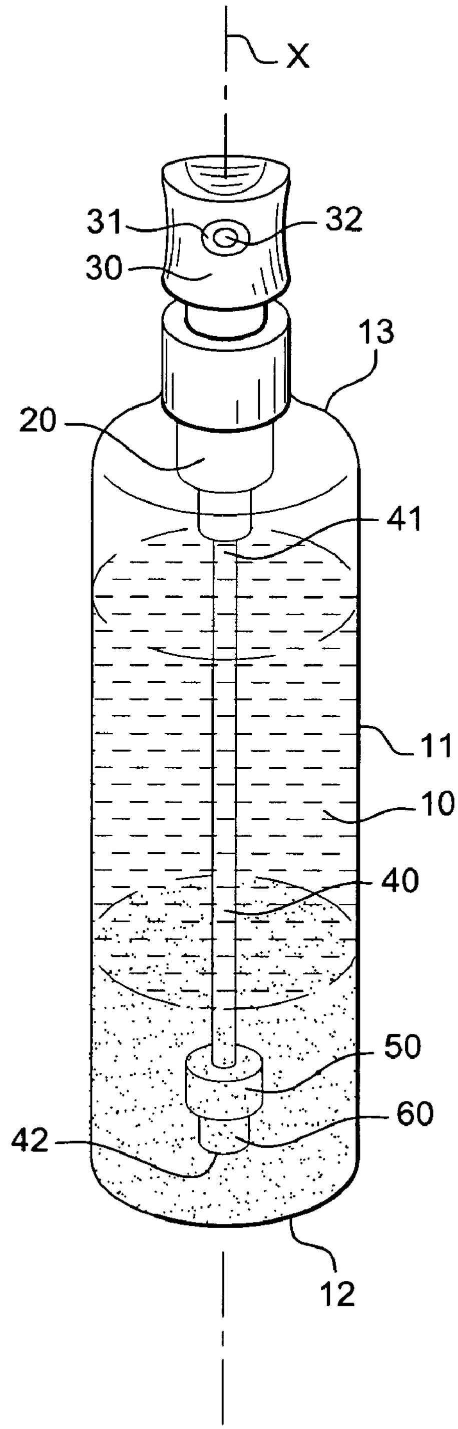
FIG. 1 is a perspective view of one embodiment of a packaging and dispensing assembly according to the invention.
Figure 2:
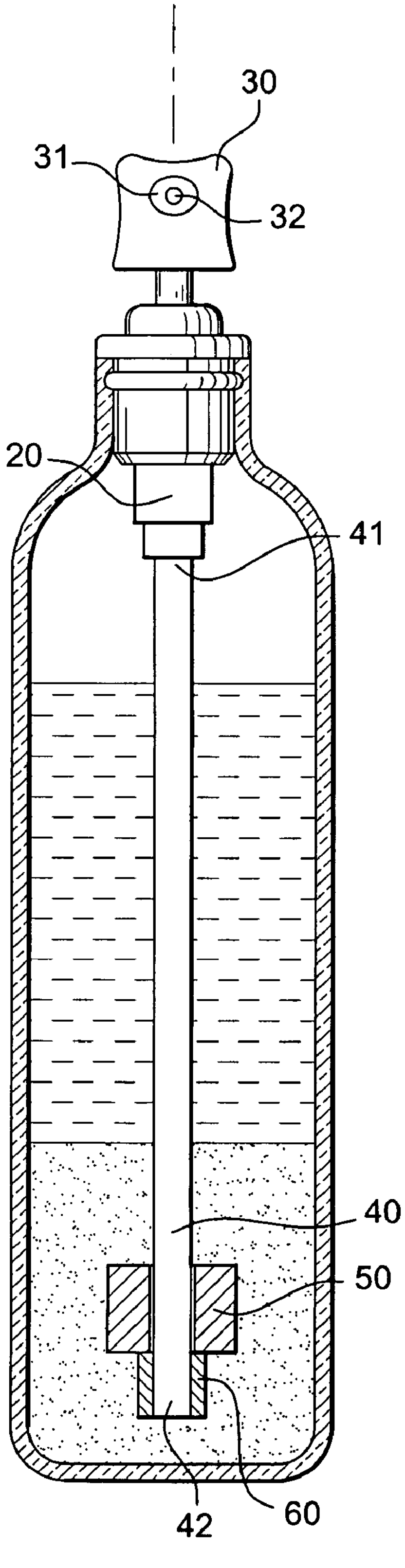
FIG. 2 is a cross section through the device seen in FIG. 1.

Turning now to the drawings, examples of embodiments of the invention will now be described. The example illustrated in FIG. 1 includes a container 10 in the form of a bottle, which may be of glass, with the bottle being surmounted by a dispensing element 20 and a push-button 30 for operating the dispensing element 20 in such a way as to dispense the product through a dispensing orifice 32.

The container 10 contains a fluid product to be dispensed, such as a more or less viscous liquid product. Examples of such products include a cosmetic product such as a fragrance, a sun-screen product, a hair care product, or a moisturizing product for the skin.

The product preferably includes at least two phases that are not permanently miscible with each other.

The products in the container may, for example, be two immiscible oily phases having different densities; an oily phase and an aqueous phase; or an oily phase and a hydroalcoholic phase. Thus, because of the density difference between the two immiscible phases, the heavy phase will sink to the bottom of the container, while the light phase will float on top of the heavy phase. The rate of phase separation can depend on the density difference between the two phases. When the contents of the container are shaken, a more or less homogeneous "mixture" of the two phases forms as a dispersion, suspension or emulsion. When this is left to stand, the phases "unmix" or separate because of the difference between their densities.

Another possibility is a liquid phase and a particulate (e.g. solid) phase. The particles may be heavier or lighter than the liquid phase. Such particles may be in the form, for example, of a powder, microcapsules or nanocapsules, pigments, fillers or nacres.

The two phases may be separated, either for aesthetic reasons (two different colors) or for reasons of incompatibility of the compounds of each of the phases.

In the illustrated preferred example, the container containing the product is elongated along an axis X. It has a side wall 11 with one end closed by a base 12 and the other end 13 terminating in an open neck to which the dispensing element 20 is fitted. In the illustrated example, the cross section of the container is circular, approximately constant throughout the axial height of the container, and narrowing to the neck at the top 13 in such a way as to form a shoulder. In the example illustrated, the cross section of the container has a small diameter compared with its axial height and forms a container having a tubular shape. The container may of course be of any other shape, and have any other section.

According to one example, the container is transparent so that the product contained inside it, and in particular the two phases separated at rest, can be seen. By selecting the colors of the different phases and that of the moving part, an attractive aesthetic effect can be obtained from an ordinary transparent container. Alternately, a portion of the container could be transparent. A portion or all of the container could also be partially transparent (e.g., translucent).

The dispensing element 20 which surmounts the container is in the form of a pump. The push-button 30 designed to operate the pump includes a release arrangement or outlet arrangement in the form of a nozzle 31 which defines the dispensing orifice 32. Other release/outlet arrangements may be used. Examples include a grille or other outlet orifice, a frit, an applicator end piece, etc.

The pump 20 may be mounted on the container 10, or on an intermediate mounting part, for example by crimping, screwing or force-fitting. The pump 20, which is not shown in detail in the figures, includes a pump body into which feeds a first end 41 of a dip tube 40 designed to carry the product from the container to the pump.

As can be seen in FIG. 1, the dip tube 40 extends from the pump 20 approximately along the axis X. In the illustrated example, the dip tube 40 includes, remote from the end 41 fixed to the dispensing head, an open free end 42 through which the product contained in the container can be sucked up into the pump body.

A moving body 50 is fitted around the dip tube in a sliding fit so as to move the product and encourage the phases of the product to mix together. The moving body 50 is advantageously made of a much denser material than the product P to be dispensed. The reason for this is that the greater the difference between the density of the body and that of the product, the more quickly the body will move through the product to mix the different phases.

The moving body 50 may for example be a cylinder of revolution with a central opening to allow it to sit around the dip tube. The moving body is made in one piece. It may alternatively be made from two or more parts connected together.

In accordance with the invention, the moving body could also be of any other shape. The body may for example be spherical, olive-shaped, helical, a torroid, star-shaped, etc. If desired, the shape of the container may then be chosen to suit that of the body, so for example a container may be chosen with a cross section of the same shape as that of the body. The central hole may also be other than circular in shape. For example, a shape that contributes to the desired aesthetic effect can preferably be chosen.

To keep the sliding body on the tube, a stop piece 60 is provided. In the illustrated example, the stop piece is preferably provided at the end 42 of the tube situated towards the base of the container.

In the example illustrated, the stop piece 60 is a separate component, for example, force-fitted onto the dip tube at its end 42.

Alternatively the stop piece may be integral with the dip tube. In particular, it may be formed by an increase in the thickness of the wall of the tube.

In the example illustrated, the stop piece 60 is located at the end of the tube situated towards the base of the container. The stop piece may also be formed at a distance from the ends of the tube. However, it is preferable to give the sliding body the greatest possible distance to move.

In one particular illustrative embodiment, by way of example, the container has an axial height of approximately 13 cm and a diameter of approximately 2 cm. The outside diameter of the dip tube is approximately equal to 1.6 mm. The stop piece 60 has an outside diameter of approximately 4 mm. The moving body has an outside diameter approximately equal to 7 mm and an axial height approximately equal to 12 mm. The moving body is made of PCTA.

Also, according to an example, the product to be dispensed is a fragrance containing two immiscible phases or components of different densities. The heavier phase or component is colorless and the lighter phase is colored. Thus, the components have different color properties. Alternately, the components could have two different colors or two different color densities to provide different color properties. The dip tube and the stop piece are also transparent so as to pass almost unnoticed, while the moving body is colored. Thus, at rest, when the two phases are separated, a colored product can be seen in the top of the container and a colorless product in the bottom. In this position, the moving body is resting on the stop piece, towards the base of the container, so that the eye sees a colored body in the middle of a colorless product. Since the dip tube and the stop piece are colorless, the impression given is of a moving body floating inside the container, because the stop piece is raised somewhat above the base of the container.

By way of example, when assembling the device, the tube 40 with the moving body 50 sitting on it is force-fitted to the pump body, equipped with the push-button, while the moving body is retained by the stop piece 60.

Such a pre-assembled assembly described in the preceding paragraph can easily be delivered on the container filling line with no risk of losing the moving body which is held in place on the dip tube. Once the container has been filled with the product, the pre-assembled assembly can be fixed to the container neck after first inserting the tube down inside the container.

To dispense the product, the user shakes the device by, for example, turning the head first up then down several times, until the two phases are mixed. He can then dispense the product in the conventional way, operating the pump by means of the push-button.

In the above detailed description, reference has been made to preferred embodiments of the invention. Clearly, variants may be made to this without departing from the invention as claimed below. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for packaging and dispensing a product comprising:

a container forming a holder for the product;

a dispensing element surmounting the container;

a dip tube for supplying product to the dispensing element, the dip tube being connected to the dispensing element at a first end, and wherein the dip tube includes an opening at a second end opposite the first end, such that the product enters the dip tube through the opening; and a body which is slidably mounted to slide along the dip tube, and wherein the body is configured such that the body slides along and moves relative to the dip tube upon shaking of the container such that the body provides a mixing means for mixing the product upon shaking of the container;

wherein the dip tube comprises, at a distance from the first end, an element forming a stop piece for the body such that the stop piece limits movement of the body along the dip tube, said stop piece including an aperture extending therethrough such that said stop piece does not prevent the product from passing from the container into the dip tube through said opening in said dip tube.

2. A device according to claim 1, wherein the element forming the stop piece is located at the second end of the dip tube.

3. A device according to claim 1, wherein the body has a shape which is cylindrical, spherical or olive-shaped.

4. A device according to claim 1, wherein the body is a one piece body.

5. A device according to claim 1, wherein the body is formed of at least one material selected from the group consisting of plastics, pressed glass, stainless steel and zamak.

6. A device according to claim 5, wherein the body is plastic-coated.

7. A device according to claim 1, wherein the dispensing element is a pump.

8. A device according to claim 7, wherein the pump is mounted on the container by snap-fastening, screwing or crimping.

9. A device according to claim 1, wherein the dispensing element includes a push-button.

10. A device according to claim 8, wherein the push-button comprises an outlet in the form of a nozzle.

11. A device according to claim 1, wherein the container is transparent.

12. A device according to claim 11, wherein the container is made of glass.

13. A device according to claim 1, wherein the container is made of glass.

14. A device according to claim 1, wherein the container contains said product and wherein said product includes at least two mutually immiscible components having different densities, and wherein at least one of the components is a liquid.

15. A device according to claim 14, wherein the at least two components include a liquid component and a particulate component whose density is different from that of the liquid component.

16. A device according to claim 15, wherein the particulate component includes at least one of a powder, microcapsules or nanocapsules, pigments, fillers or nacres.

17. A device according to claim 14, wherein the product comprises an aqueous liquid component and an oily liquid component.

18. A device according to claim 14, wherein at least part of the container is at least partially transparent.

19. A device according to claim 18, wherein the two components have different color properties.

20. A device according to claim 19, wherein the body has a color different than one of the two components.

21. A device according to claim 20, wherein one of the two components is colorless.

22. A device according to claim 20, wherein before a first use and before shaking of the device, a denser one of the at least two components is located in a lower portion of the container and a less dense component is located in an upper portion of the container and wherein at least part of the container is at least partially transparent and the body is visible through the more dense component.

23. A device according to claim 22, wherein the container is transparent.

24. A device according to claim 22, wherein the more dense component is colorless.

25. A device according to claim 24, wherein the product is a cosmetic product.

26. A device according to claim 25, wherein the dip tube has a different color property than said body.

27. A device according to claim 1, wherein said product is a cosmetic product disposed in said container.

28. A device according to claim 27, wherein the product comprises first and second components, with the first component more dense than the second component, and wherein prior to a first use and prior to shaking of the device the body is positioned within the first component.

29. A device according to claim 28, wherein the product is a fragrance.

30. A device according to claim 28, wherein said first component has a different color property than said second component, and wherein said body has a different color property than said first component, and wherein at least part of the container is at least partially transparent and the body is visible through said container and through said first component.

31. A device according to claim 1, wherein the product is contained in the container, and wherein the body is formed of a material having a density greater than a density of said product.

32. A device according to claim 31, wherein said body has an outer diameter larger than an outer diameter of said stop piece.

33. A device according to claim 32, wherein the product is a cosmetic product disposed in the container, and the body is visible through the container and the product prior to shaking of the container.

* * * * *